(12) United States Patent
Lea et al.

(10) Patent No.: US 9,361,852 B2
(45) Date of Patent: Jun. 7, 2016

(54) MEDIA REPRODUCTION DEVICE

(75) Inventors: Perry V Lea, Eagle, ID (US); Bradley R Larson, Meridian, ID (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 595 days.

(21) Appl. No.: 13/175,862

(22) Filed: Jul. 3, 2011

(65) Prior Publication Data
US 2013/0002674 A1 Jan. 3, 2013

(51) Int. Cl.
*G06T 17/00* (2006.01)
*G09G 5/00* (2006.01)
*H04N 19/48* (2014.01)

(52) U.S. Cl.
CPC ................. *G09G 5/00* (2013.01); *H04N 19/48* (2014.11); *G09G 2370/027* (2013.01)

(58) Field of Classification Search
CPC ................. H04N 19/30–19/395; H04N 19/48; H04N 19/60–19/649
See application file for complete search history.

(56) References Cited

U.S. PATENT DOCUMENTS

| | | | |
|---|---|---|---|
| 6,414,679 B1 * | 7/2002 | Miodonski et al. | 345/420 |
| 7,062,107 B1 * | 6/2006 | Crosby et al. | 382/299 |
| 8,081,827 B2 * | 12/2011 | Gormish et al. | 382/232 |
| 2004/0213472 A1 * | 10/2004 | Kodama et al. | 382/239 |
| 2008/0122864 A1 * | 5/2008 | Utsunomiya et al. | 345/619 |
| 2008/0144952 A1 * | 6/2008 | Chen et al. | 382/239 |
| 2008/0238928 A1 * | 10/2008 | Poddar et al. | 345/555 |

OTHER PUBLICATIONS

Map Image Compression for Real-time Applications. Ottawa 2010. ECW (wavelet Compression for Digital Imagery and Image Web Server From Earth Resource Mapping Pty. Ltd.). Nov. 30, 2010.

* cited by examiner

*Primary Examiner* — Charles Tseng
(74) *Attorney, Agent, or Firm* — Hanley, Flight & Zimmerman, LLC

(57) ABSTRACT

A media reproduction device that compresses and decompresses images for display on the media reproduction device.

14 Claims, 3 Drawing Sheets

MEDIA REPRODUCTION DEVICE

BACKGROUND

Users can manipulate an image displayed on an electronic device with gesture-based motions, such as moving fingers across the display. Users can also scroll or zoom into and out of the image. If the image is a large file, then these tasks are process intensive and cannot be quickly performed by the electronic device. Many electronic devices do not have enough processing power to decompress a large image, render changes into the image, and then recompress the image in real-time such that the user experiences dynamic interaction with the image on the display.

DETAILED DESCRIPTION

Figure 1:
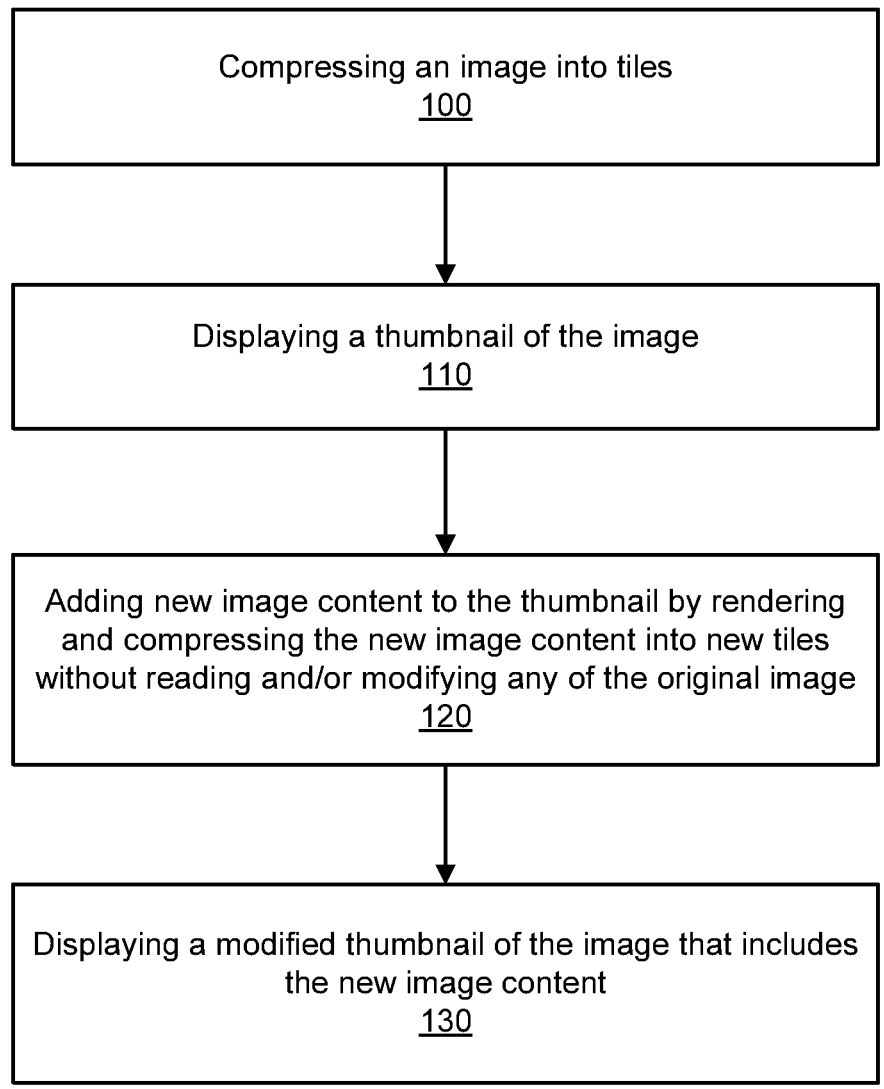
FIG. 1 is a method to add image content to an image without decompressing an entirety of the image in accordance with an example embodiment.

Example embodiments are apparatus and methods that scale and decompress partial image content of an image, such as a scanned document, in order to generate a preview image and then modify the preview image. Once the scanned document is stored in a compressed state, content of the document can be edited or manipulated without decompressing an entirety of the document. While the document is displayed as a preview image, a user can view and change content of the document while it remains in a compressed state.

In an example embodiment, an electronic device displays an image which may be a low-resolution copy or portion of the full-resolution image, on its display and enables a user to interact with the image using gesture-based motion and image editing with relatively low CPU (central processing unit) performance and memory requirements. Images are scanned and stored in the electronic device in a compressed state and a low-resolution version is derived and presented on the display as a thumbnail or preview image. The full image remains in the compressed state while the user views and manipulates content of the displayed thumbnail. Image modifications and manipulations are performed by changes to meta-data of the image and are not rendered into the base image (i.e., the compressed image stored in memory). As such, no full-resolution decompression of the base image is executed. Instead, the electronic device extracts low-resolution images and displays these images as previews on the display of the electronic device. Thereafter, modifications are made to the image on the display and then transferred to the set of data associated with the base image.

Example embodiments are utilized in a wide variety of electronic devices. These electronic devices include, but are not limited to, media reproduction devices (MRD). As used herein, a media reproduction device or MRD is an electronic device that performs one or more of printing, copying, scanning, and sending/receiving facsimiles. In one example embodiment, the electronic media reproduction device is a multi-functional printing device that incorporates the functionality of a computer and/or one or more peripheral devices, such as a printer, copier, scanner, facsimile machine, telephone, etc.

With example embodiments, a user can scan or retrieve documents on the MRD and then view images of the documents on a display or graphical user interface (GUI) on the MRD. While the image is being displayed on the MRD, the user can edit and manipulate the image using multi-point touch scaling, rotation, cropping, and placement. For example, the user can repeatedly scale or zoom into and out of the image with enhanced scaling resolution and quality. The user can also edit the content of the image being displayed by, for example, striking out certain text like a name or phone number with a finger swipe, highlighting text, adding watermarks, adding text, etc. This new content is added to the image meta-data of the fully compressed image that is stored in memory.

Image manipulation and scaling occur on the compressed image (as opposed to decompressing the entire image, rendering the image, making changes on the rendered image, and then recompressing the changed image). As such, example embodiments save a large amount of memory and processing resources on the MRD since the entire image is not decompressed, rendered, and re-compressed. For example, a single scanned page (which can be about 100 MB) remains in the compressed format while modifications are made to its corresponding thumbnail or preview image being displayed on the display of the MRD. This can save 80 MB to 90 MB of RAM depending on the image content. While the image remains in the compressed state, a user can zoom and scale images on the screen at full resolution to the screen geometry. Users can also pan, zoom, and scroll images on a UI in real-time without having to decompress an entire page or use a firmware based scaling algorithm.

FIG. 1 is a method to add image content to an image without decompressing an entirety of the image in accordance with an example embodiment.

According to block 100, a media reproduction device compresses an image into tiles. By way of example, the image can be a scanned document that is scanned at the media reproduction device or received at the media reproduction device.

According to block 110, a thumbnail or preview of the image is displayed on the media reproduction device. The media reproduction device generates a low resolution thumbnail and displays this thumbnail on a display or screen.

According to block 120, the media reproduction device adds new image content to the thumbnail by rendering and compressing the new image content into new tiles without reading or modifying any of the original image. The original image remains in a compressed format while the new image content is added to the image as a new layer with metadata describing how to combine them. The display includes a user interface (UI) that receives commands from a user to modify or edit the thumbnail. Changes to the thumbnail are correlated back to the compressed image.

The media reproduction device receives input on a graphical user interface from a user to add the new image content (such as text or graphics) to the thumbnail. For instance, the media reproduction device receives finger gestures on the display to add new content to the thumbnail. The addition of this new content is performed without modifying any of the base image and without receiving processing resources from a processor external to the media reproduction device, such as an external cloud server. Alternatively, the media reproduction device receives user input to perform a zoom or pan operation on the thumbnail.

According to block 130, the media reproduction device displays a modified thumbnail of the image that includes the new image content. By way of example, a user interacts with the display on the media reproduction device to add text or other new content to the thumbnail. This text represents the new image content that is then added to the set of data associated with the compressed image. A modified thumbnail is then generated by extracting the proper resolution elements of the new content and the original content and combining them in accordance with the directions stored in the metadata associated with the image.

Figure 2:
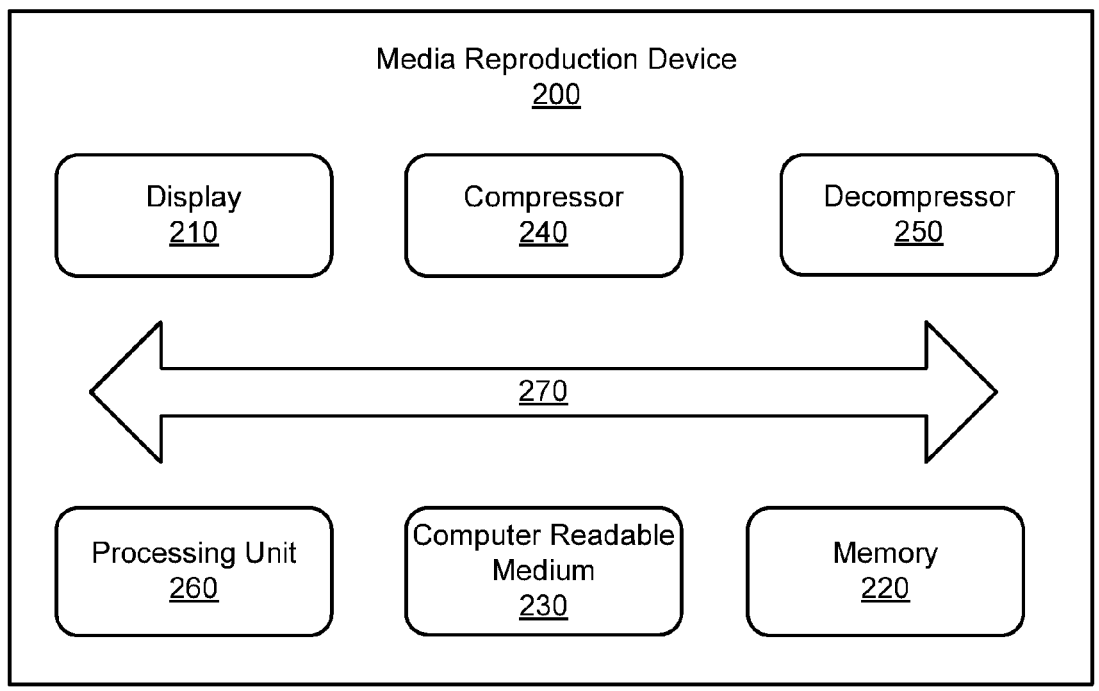
FIG. 2 is a block diagram of a media reproduction device that decompresses and modifies partial image content in accordance with an example embodiment.

FIG. 2 is a block diagram of a media reproduction device 200 that decompresses and modifies partial image content in accordance with an example embodiment.

The media reproduction device 200 includes a display 210, memory 220, computer readable medium 230 to control content on the display, a compressor 240, a decompressor 250, a processing unit 260, and one or more busses or communication paths 270.

The processing unit 260 (such as a central processing unit, CPU, microprocessor, application-specific integrated circuit (ASIC), etc.) controls the overall operation of memory 220 (such as random access memory (RAM) for temporary data storage, read only memory (ROM) for permanent data storage, and firmware). The processing unit 260 communicates with the display 210, memory 220, computer readable storage medium 230, compressor 240, and decompressor 250 to perform methods in accordance with example embodiments.

The media reproduction device 200 compresses images as small units such as tiles rather than as strips or as a complete image. The media reproduction device then constructs a table of contents (TOC) that links to each tile of compressed data and links the tiles together in a proper order. The TOC entries also include metadata to indicate how the tiles are processed.

The compressor 240 reads an image (such as a scanned document or other rendered printable image data) and creates a compressed collection of tiles and a corresponding TOC. The source image may originally be from a digital scan or capture of physical media or may have come into the device in the form of electronic printable data in any number of standard formats, such as a portable document format (PDF).

The decompressor 250 follows any linked TOC or subset and may decompress it to the original resolution image. Alternately, the decompressor 250 may follow any linked TOC or subset and extracts a low-resolution output of the image that is displayed as a thumbnail or preview image on the display 210. The decompressor executes these tasks directly from compressed data information to low resolution output (as opposed to decompressing an entirety of the image to full resolution and re-sampling the image to a lower resolution). By way of example, the decompressor reads each compressed header, determines the method of compression used, and directly creates a corresponding pixel or array of pixels that represent that information in a lower resolution form. This process saves clock-cycles otherwise used to generate the full-resolution output and eliminates the step of re-sampling the image down to the target low resolution for the display.

The decompressor 250 also directs TOC processing to each tile as it passes through the decompressor. By way of example, this process includes, but is not limited to, orthogonal rotations and vertical/horizontal mirroring, image masking/fills, alpha-blending layers over background, and arbitrary layer placement. These operations are performed efficiently, in-line as the data is extracted from the compressed data.

The computer readable medium 230, compressor 240, and decompressor 250 can be a combination of one or more of hardware, firmware, and software. For example, to provide the hardware with correct coordinates and geometry to extract from the compressed image, firmware controls the screen content and request updates to the viewable data as the user pans, scrolls, and zooms the thumbnail. A user may use finger gestures on the display 210 to zoom into the document or change the coordinates. In this case, a new area of the image will be extracted and then presented to be available to be previewed.

The performance of the media reproduction device is such that the user-requested marks and image operations are mapped directly into manipulations that the HW executes whether the target is the display on the media reproduction device or a final output that can be printed, saved, emailed, stored, etc. This gives the user the ability to see what their changes will look like on the thumbnail. In addition, the user can zoom up or down on the thumbnail. Such zooming can be to a print resolution without any significant performance or memory issues since the base image remains compressed during the zoom operations. During a given time, the amount of data extracted is the amount sufficient to fill the screen resolution.

The following example illustrates panning and scrolling on a media reproduction device that has an image preview window shown on a UI with 400×200 pixels and displays a scanned image starting at coordinate (0, 0). If the user pans to the right by 100 pixels, then a new swath of image tiles are decompressed and previewed. Firmware adjusts the coordinates and requests that an area of the page from (100, 0) to (500, 200) be decompressed. These parameters propagate from application code controlling the UI to a device driver that ultimately controls the hardware. The hardware is programmed by the driver to extract a requested resolution from a set of tiles within that coordinate range. The data is extracted and returned to the application to be previewed.

The following example illustrates zooming on a media reproduction device that has a multi-touch capacitive display. A user interacts with the display to stretch an area of the page to be zoomed-in or zoomed-out. In this case, the area to program the decompressor is based on an amount of stretch applied by the user. For instance, if the stretch is fifty-percent (50%) of the current image display, then driver is called to control the underlying hardware and to request a decompression of the original image given the new coordinates and scale factor. The requested portion of the image is extracted and displayed on the UI window of the media reproduction device.

The following example illustrates marking a scanned image on a media reproduction device that has a display displaying a thumbnail of the scanned image. If the user marks an area of the displayed image with additional content (such as a watermark or some other mark) that content is rendered by firmware and compressed into a separate frame as a set of tiles. The original image is not decompressed and remarked with this additional content. Rather, the separate watermark will exist as another layer of marks. At the time of printing or generating a new thumbnail, video hardware is programmed to gather from the two layers (original and marked layers) and ultimately print, display or store what the user edited.

Figure 3:
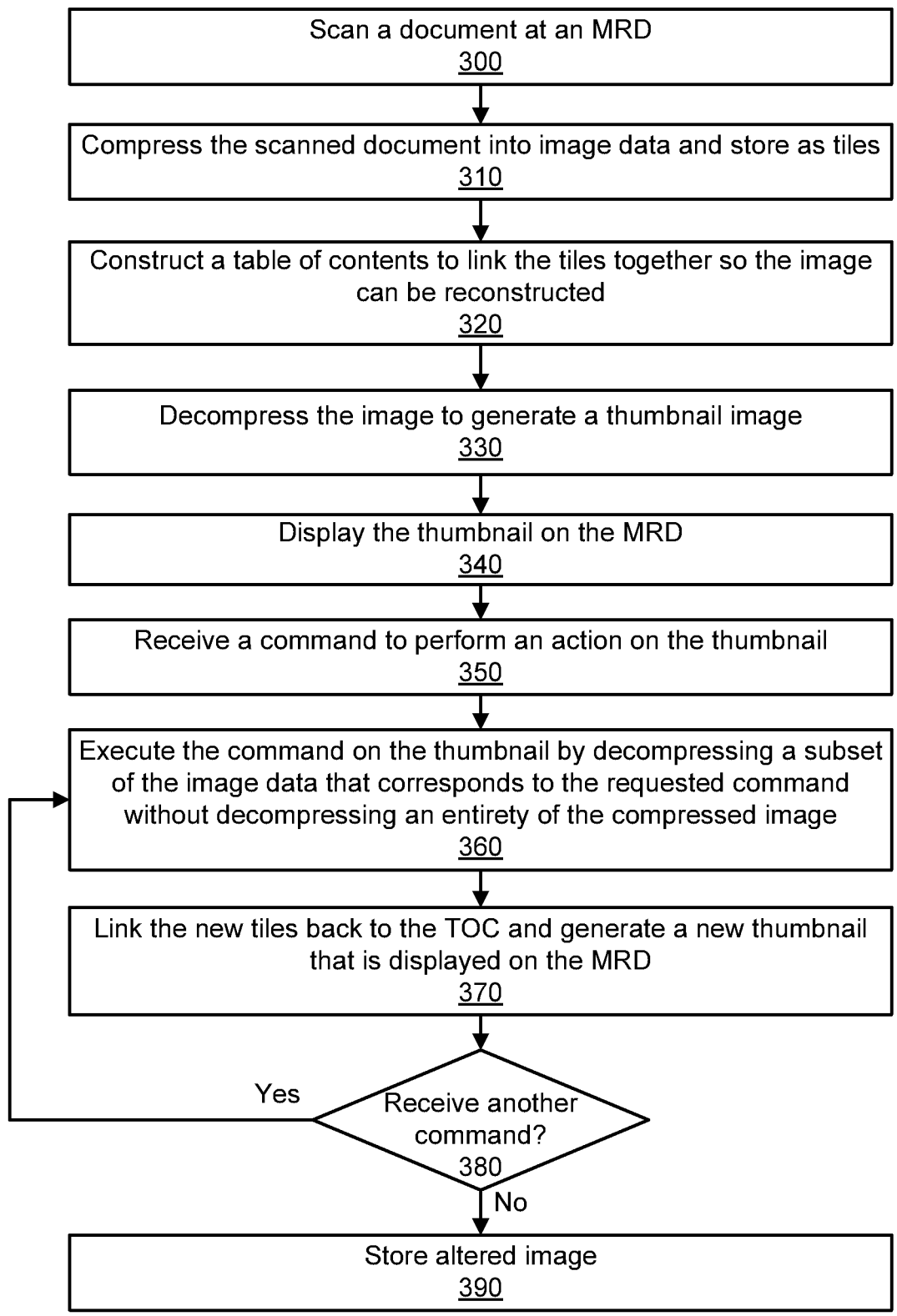
FIG. 3 is method to decompress a subset of image data without decompressing an entirety of the image data in accordance with an example embodiment.

FIG. 3 is method to decompress a subset of image data without decompressing an entirety of the image data in accordance with an example embodiment.

According to block 300, a document is scanned at an MRD. Alternatively, the scanned document is downloaded to or received at the MRD. For example, the MRD obtains a PDF image from a peripheral device (such as a camera), portable memory card, or a network (such as downloading the image from the internet or receiving the image as an email).

According to block 310, the MRD compresses the scanned document into image data and store the compressed image data as tiles in memory.

According to block 320, the MRD constructs a table of contents (TOC) to link the tiles together so the image can be reconstructed.

According to block 330, the image is decompressed to generate a thumbnail image or preview image.

According to block 340, the thumbnail or preview image is displayed on a display of the MRD. The thumbnail or preview image can be generated by instructing hardware what portions of the image and what output resolution is desired.

According to block 350, the MRD receives a command to perform an action on the thumbnail or preview image. The commands include, but are not limited to, scrolling, zooming in, zooming out, panning, tilting, highlighting, adding or removing text, adding or removing images (such as adding a watermark), and performing other types of editing functions (such as underlining, adding a comment box, taking a snapshot, etc.).

According to block 360, the MRD executes the command on the thumbnail or preview image by decompressing a subset of the image data that corresponds to the requested command without decompressing an entirety of the compressed image. For example, partial content of the compressed image or a subset of the tiles are decompressed, and a low-resolution output of the subset is generated.

Manipulations or changes are made to the subset of image data by modifying metadata in the TOC. Alternatively, additional image content is made by rendering the new content in a new layer and then compressing this layer.

According to block 370, the MRD links the new tiles back to the TOC and generates a new thumbnail or preview image that is displayed on the display of the MRD. For example, the compressed tiles are linked into the base image by linking their TOC entries into the base TOC so that they are placed in the desired location and blended into the image.

A new thumbnail is quickly generated and displayed on the media reproduction device by giving this new TOC to hardware and having it generate a low resolution output. This new thumbnail image accurately represents the real image because it is processed the way that the final output (e.g., a print of the image) will be except that it is at a lower resolution. If the final output is a print job, then the final output is processed by the hardware to full resolution at full speed by the print pipeline.

According to block 380, a determination is made as to whether another command is received to execute on the thumbnail or preview image. If the answer to this determination is yes, then flow proceeds back to block 360, and the command is executed. If the answer to this determination is no, then flow proceeds to block 390.

According to block 390, the altered image is stored in memory of the MRD and/or an action is performed on the altered image. For example, the MRD prints the image, sends the image to a computer or peripheral device, transmits the image over a network (such as emailing the image), or stores the image on a portable memory device.

Blocks discussed herein can be automated and executed by a computer or electronic device. The term "automated" means controlled operation of an apparatus, system, and/or process using computers and/or mechanical/electrical devices without the necessity of human intervention, observation, effort, and/or decision.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

What is claimed is:

1. A method performed by a media reproduction device, comprising:

compressing, by the media reproduction device, an image into first tiles to create a compressed image;

generating a table of contents (TOC) that links the first tiles together, the TOC including metadata indicating how the first tiles are to be processed for subsequent display;

displaying, on the media reproduction device, a first thumbnail of the image;

decompressing a first subset of the compressed image that corresponds to a first command received at the media reproduction device without decompressing an entirety of the compressed image;

processing the decompressed first subset of the compressed image based on the metadata as the first subset is decompressed, the processing including at least one of orthogonal rotation, vertical mirroring, horizontal mirroring, image masking, image fills, alpha-blending layers over background, or arbitrary layer placement;

adding, by the media reproduction device, new content based on the first command by rendering and compressing the new content into second tiles without modifying the compressed image;

linking TOC entries for the second tiles into the TOC;

displaying, on the media reproduction device, a modified thumbnail of the image that includes the new content;

determining whether a second command has been received for executing on the modified thumbnail; and in response to determining that the second command has been received for executing on the modified thumbnail, decompressing a second subset of the compressed image that corresponds to the second command without decompressing the entirety of the compressed image.

2. The method of claim 1, further including linking the second tiles into the image to generate the modified thumbnail.

3. The method of claim 1, further including receiving gestures on a display of the media reproduction device to zoom into the first thumbnail; and
zooming into the first thumbnail without decompressing the entirety of the image and without using processing resources from a processor external to the media reproduction device.

4. The method of claim 1 wherein adding the new content includes modifying metadata in the TOC to add the new content to the first thumbnail.

5. A non-transitory computer readable storage device comprising instructions that when executed cause a media reproduction device to at least:
compress a scanned document into image data including first tiles;
generate a table of contents (TOC) that links the first tiles together, the TOC including metadata indicating how the first tiles are to be processed for subsequent display;
display a first preview of the scanned document on a display of the media reproduction device;
decompress a first subset of the image data that corresponds to a first command received at the media reproduction device without decompressing an entirety of the image data;
process the decompressed first subset of the image data based on the metadata as the first subset is decompressed, the processing including at least one of orthogonal rotation, vertical mirroring, horizontal mirroring, image masking, image fills, alpha-blending layers over background, or arbitrary layer placement;
change the first subset of the image data to edit the first preview to create a second preview;
link TOC entries for second tiles corresponding to the second preview into the TOC;
display the second preview on the display of the media reproduction device;
determine whether a second command has been received for executing on the second preview; and
in response to determining that the second command has been received, decompress a second subset of the image data that corresponds to the second command without decompressing the entirety of the image data.

6. The storage device of claim 5, wherein the instructions further cause the media reproduction device to add text to the first preview through a graphical user interface on the media reproduction device to generate the second preview.

7. The storage device of claim 5, wherein the instructions further cause the media reproduction device to decompress a specific coordinate range of the scanned document in response to receiving the first command, the first command including a request to pan the first preview.

8. The storage device of claim 5, wherein the instructions further cause the media reproduction device to, in response to a request to zoom into an area of the scanned document by a specified percentage, decompress the area of the image data based on the specified percentage without decompressing the entirety of the image data.

9. The storage device of claim 5, wherein the instructions further cause the media reproduction device to add a watermark to the scanned document by rendering and compressing the watermark into a separate frame as a set of tiles without decompressing the image data.

10. A media reproduction device, comprising:
a compressor to compress an image into a compressed image by creating first tiles and to generate a table of contents (TOC) that links the first tiles together, the TOC including metadata indicating how the first tiles are to be processed for subsequent display;
a decompressor to:
decompress a first subset of the compressed image that corresponds to a first command received at the media reproduction device without decompressing an entirety of the compressed image;
process the decompressed first subset of the compressed image based on the metadata as the first subset is decompressed, the processing including at least one of orthogonal rotation, vertical mirroring, horizontal mirroring, image masking, image fills, alpha-blending layers over background, or arbitrary layer placement;
add new content based on the first command by rendering and compressing the new content into second tiles without modifying the compressed image;
linking TOC entries for the second tiles into the TOC;
output a preview image that includes the new content;
determine whether a second command has been received for executing on the preview image; and
in response to determining that the second command has been received, decompress a second subset of the compressed image that corresponds to the second command without decompressing the entirety of the compressed image; and
a display to display the preview image output by the decompressor.

11. The media reproduction device of claim 10, wherein the decompressor is to generate the preview image directly from compressed data information by generating a low resolution output of the preview image without decompressing the image to full resolution and re-sampling to the low resolution.

12. The media reproduction device of claim 10, wherein the decompressor is to read compressed headers to determine a method of compression and to create a corresponding array of pixels that represent a low resolution output without generating a full resolution output of the image.

13. The media reproduction device of claim 10, wherein the media reproduction device is to scan a document to create the image and print the document.

14. The media reproduction device of claim 10, wherein the second command includes at least one of scrolling, zooming in, zooming out, panning, tilting, highlighting, adding text, removing text, adding an image, removing an image, underlining, adding a comment box, or taking a snapshot of an image.

* * * * *